April 20, 1937.  W. H. FAILINGER  2,077,830
LEER LOADER
Filed April 24, 1936  2 Sheets-Sheet 1

Inventor
Walter H. Failinger

By Eccleston & Eccleston
Attorneys

April 20, 1937. W. H. FAILINGER 2,077,830
LEER LOADER
Filed April 24, 1936 2 Sheets-Sheet 2

Inventor
Walter H. Failinger

By Eccleston & Eccleston
Attorneys

Patented Apr. 20, 1937

2,077,830

UNITED STATES PATENT OFFICE 2,077,830

LEER LOADER

Walter H. Failinger, Washington, Pa., assignor to Hazel-Atlas Glass Company, Wheeling, W. Va., a corporation of West Virginia Application April 24, 1936, Serial No. 76,223

6 Claims. (Cl. 198—31)

The invention relates to mechanisms for delivering glass articles from a conveyer of any type, such as an endless chain conveyer or a rotary table, to the endless conveyer of a leer, by which the glass articles are carried through the leer and annealed.

The glass bottles or other glass articles to be annealed are delivered onto the leer conveyer in rows, and for the best annealing results the articles of each row should be equally spaced and the rows should be equally spaced. In order to accomplish this desirable result the operation of the mechanism for delivering the glass articles to the leer conveyer must be accurately timed.

Further, the same leer is used for the annealing of glass articles of various sizes, and of course the number of articles in a row will vary with the size of the articles. The present invention therefore includes a timing mechanism, very simple in construction and operation, for initiating the operation of the feeding device when a fixed number of articles are in position in front of the leer, and also means by which the timing can be easily and quickly changed so that a different number of articles will be delivered in a row. That is, by a simple adjustment the mechanism can be made to deliver 3, 4, 5, 6, 7 or 8, etc., articles in a row.

Various other objects and advantages of the invention will be apparent to those skilled in the art, from the following detailed description when taken in connection with the accompanying drawings, in which, Figure 1 is a perspective view of the front end of a leer, the timer associated therewith, and a diagrammatically illustrated leer loader.

Figure 1:
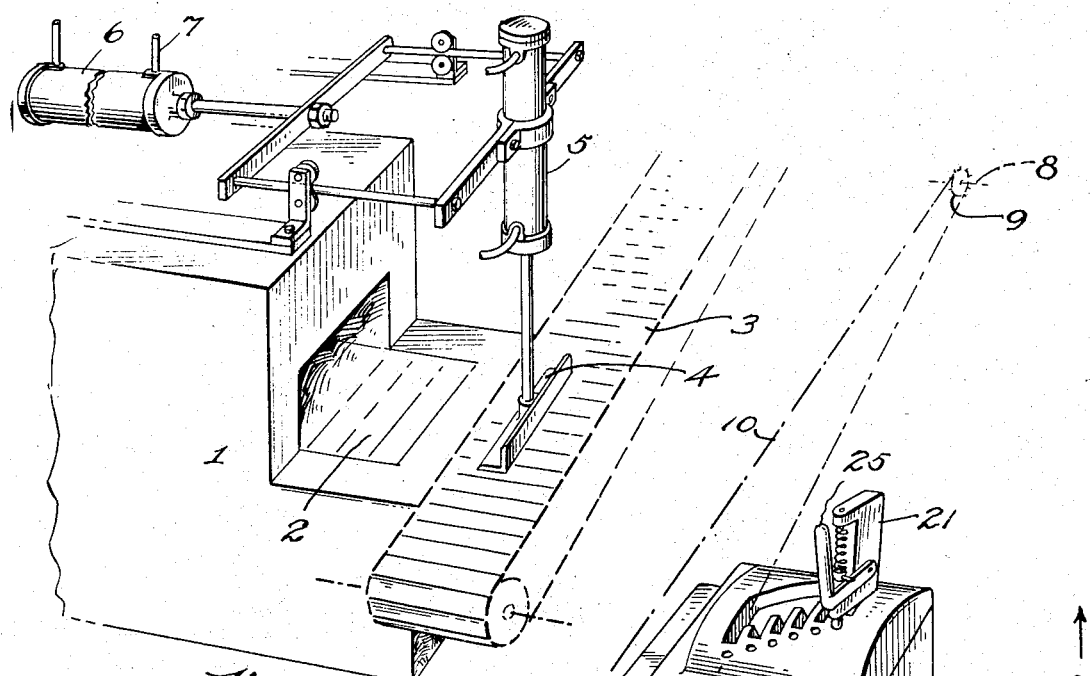

Referring to the drawings in more detail, numeral 1 indicates the front end of a leer, provided with the usual endless leer conveyer 2. Extending across the mouth of the leer is the ordinary cross-conveyer 3. The conveyer 3 is shown merely for illustration, for obviously a rotary table or any other desired type of conveyer can be employed for carrying a continuous line of ware from the forming machine (not shown) to a position in front of the leer, ready for delivery to the leer conveyer 2.

The leer loader shown in Figure 1 is illustrated diagrammatically only, and is of the type shown in Ross Patent No. 2,001,332, granted May 14, 1932. Numeral 4 refers to a pusher bar which sweeps a row of ware from the cross-conveyer 3 or other conveyer, onto the leer conveyer 2. The pusher bar is raised and lowered by the cylinder 5, and the forward and backward movement of the pusher bar is controlled by the cylinder 6. The operation of this type of leer loader is such that an entire cycle of operation is initiated by the admission of fluid pressure through pipe 7 to the front end of cylinder 6. That is, when fluid pressure is admitted to cylinder 6 through pipe 7, the pusher 4 sweeps a row of ware from the cross-conveyer onto the leer conveyer, the pusher is then lifted by cylinder 5, then moved back over the cross-conveyer by cylinder 6, and then lowered into position ready to sweep the next row of ware into the leer when the next cycle is initiated by the admission of fluid pressure through pipe 7 to cylinder 6. The mechanism for timing such admission of fluid pressure to cylinder 6, and for changing the timing so as to deliver a different number of articles, will now be described.

The forming machine (not shown) is of course operating continuously, and these formed articles are delivered in a continuous line to the cross-conveyer, which carries the articles across the front of the leer. It may be desirable to deliver only 3, 4, 5 or 6, etc., articles in a row, if relatively large articles are being handled, or a much larger number of articles if they are relatively small. In accordance with the present invention the leer loader is made to operate every time the forming machine has made three articles, or every time the forming machine has made four articles, etc., up to sixteen articles in a row, in the specific embodiment illustrated.

Numeral 8 refers to the cam shaft of a forming machine, which may be a press, a press and blow machine, or any other desired type of machine. As is well known this shaft carries the various cams for causing the various elements of the forming machine to operate at the proper time and in the proper order. Mounted on this shaft is a sprocket wheel 9 which, by means of a sprocket chain 10, drives a sprocket wheel 11 keyed to a stub shaft 12. The sprocket wheels 9 and 11 are of the same size, so that every time the cam shaft 8 makes a complete rotation, thereby causing one bottle or other glass article to be formed, the shaft 12 will also make a complete rotation.

The stub shaft 12 is mounted in a supplemental casing 13 which is removably attached to the main casing 14 in which the gear-shift mechanism to be described, is housed. The stub shaft 12 carries a gear 15 which meshes with a gear 16 keyed to a stub shaft 17. In this specific embodiment the gears 15 and 16 are of a two to one ratio, but when it is desired to substitute gears of a different ratio it is only necessary to remove the supplemental casing 13 and substitute other gears of a different ratio, in place of gears 15 and 16, and without in any way disturbing the gears in the main casing 14.

The stub shaft 17 which carries the gear 16 also carries a gear 18; the gears 16 and 18 having a two to one ratio. And the gear 18 meshes with a gear 19 keyed to a shaft 20 which is mounted in and extends throughout the length of the main casing 14, the ratio of gears 18 and 19 being one to two.

From the foregoing description it will be noted that every time the cam shaft 8 makes a complete rotation, to cause the manufacture of one bottle or other glass article, the shaft 20 will make only one quarter of a rotation, for sprockets 9 and 11 are of the same size, gears 15 and 16 are of a one to two ratio, and gears 18 and 19 are also of a one to two ratio.

Numeral 21 refers to a gear shift arm which is slidably and oscillatably mounted on the shaft 20. Housed in this arm are three meshing gears 22, 23 and 24, all of the same size, and arranged one above the other. The bottom gear 22 is slidably keyed to the shaft 21, so that it will rotate with the shaft but can be shifted longitudinally of the shaft when the gear shift arm is moved along the shaft. Any ordinary latch mechanism 25 is provided for the purpose of locking the gear shift arm 21 in any one of its various positions.

Numeral 26 refers to a shaft which is mounted in the main casing 14 and extends the full length thereof. Fixed to this shaft are gears 27, 28, 29, 30, 31 and 32. The ratio of gear 24 to gear 27, which is the smallest of the cone gears, is four to three, the ratio to gear 28 is four to four, the ratio to gear 29 is four to five, etc.

Figure 2:
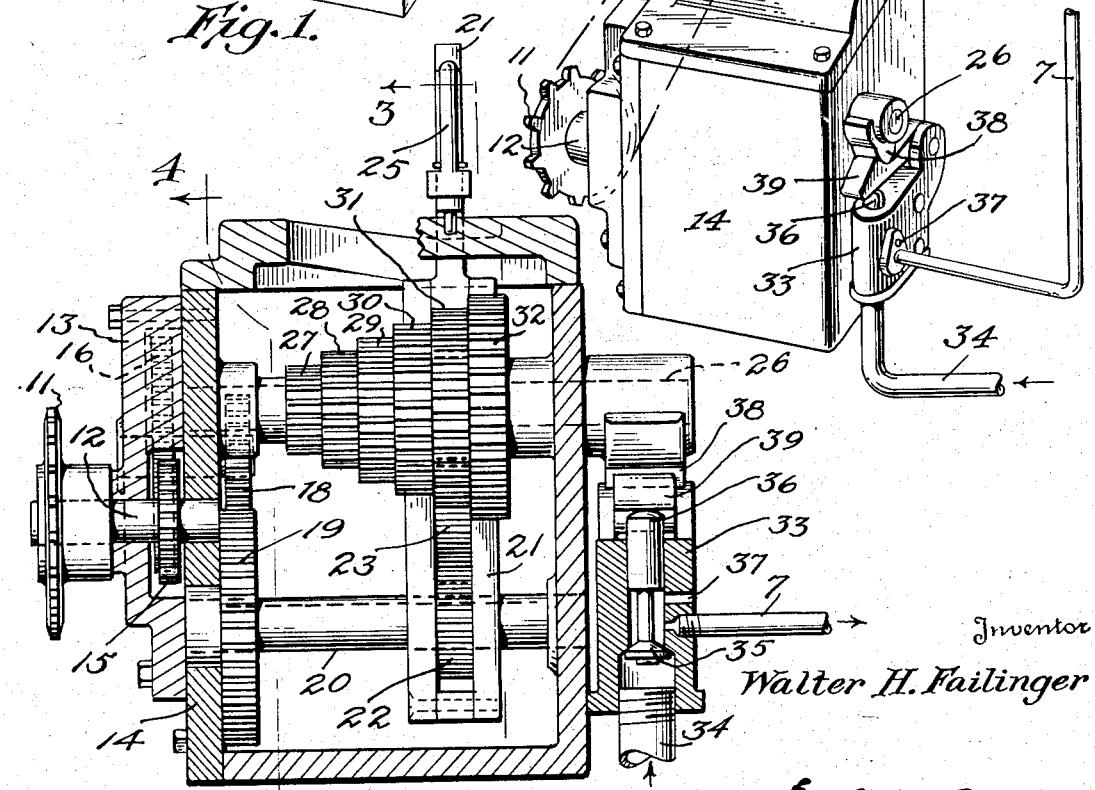
Figure 2 is a vertical longitudinal sectional view of the timer.
Figure 3:
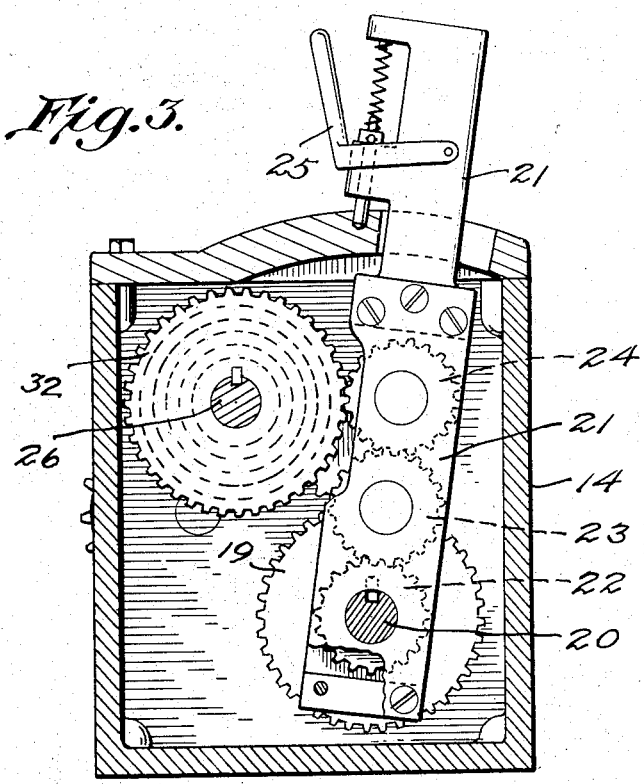
Figure 3 is a vertical transverse sectional view of the timer, taken on line 3—3 of Figure 2.
Figure 4:
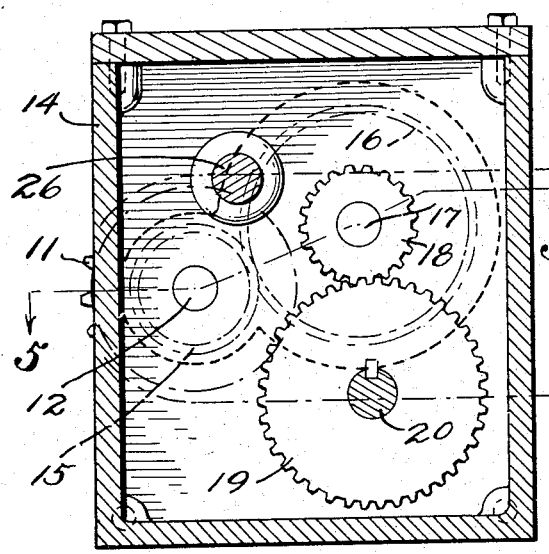
Figure 4 is a vertical transverse sectional view of the timer taken on line 4—4 of Figure 2.
Figure 5:
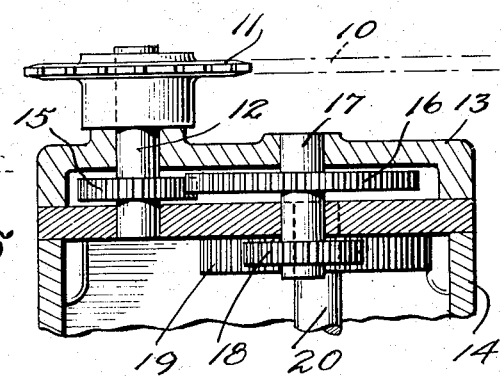
Figure 5 is a fragmentary horizontal sectional view taken on line 5—5 of Figure 4.

A valve body 33 is attached to the casing 14, and numeral 34 refers to a compressed air line leading from any desired source to the lower end of the valve body. The valve 35 is normally maintained in its uppermost position, against its seat, by the pressure from line 34, as shown in Figure 2; and the stem 36 of the valve projects upwardly above the valve body. An air line 7 leads from the side of the valve body at a point above the valve 35, and numeral 37 refers to an exhaust port. The construction and arrangement is such, as clearly shown in Figure 2, that when the valve stem is forced downwardly it unseats the valve 35, thereby admitting pressure to line 7 to initiate the operation of the pusher bar 4 to sweep a row of ware from the conveyer 3 onto the leer conveyer 2; and this downward movement of the valve stem simultaneously closes the exhaust port 37. When the valve 35 is permitted to rise communication is shut off between lines 34 and 7, and line 7 is exhausted through port 37.

The shaft 26, which carries the cone gears 27 to 32, extends beyond the casing 14 and carries on its end a trigger 38, and each time the shaft 26 makes a complete rotation the trigger 38 engages and depresses a pivotally mounted finger 39, thereby depressing the valve stem 36 and valve 35.

As previously mentioned, the cam shaft 8 of the forming machine (not shown) makes a complete rotation for every bottle or other glass article manufactured by the forming machine. And in the specific arrangement illustrated, with the one to two ratio of the gears 15 and 16, and gears 18 and 19, the shaft 20 will make a complete rotation every time four articles have been made by the forming machine. Now if the gear shift arm 21 is shifted along the shaft 20 to bring gear 24 into mesh with gear 27, which gears as previously mentioned have a four to three ratio, then the shaft 26 will make a complete rotation every time three articles have been made on the forming machine. And each time the shaft 26 makes a complete rotation the trigger 38 causes the valve 35 to be opened, thereby permitting fluid pressure to pass through pipe 7 to cylinder 6. And of course when pressure is thus admitted to cylinder 6 the pusher bar moves forward to sweep a row of three articles from any type of conveyer, such as cross-conveyer 3, onto the leer conveyer. The leer loader automatically completes its cycle of operation, bringing the pusher bar back to its original position, in any desired manner, for example as shown and described in the above-mentioned Ross Patent No. 2,001,332. In the meantime the shaft 26 is continuing its rotation, and when it has completed another rotation the trigger 38 will again open valve 35 to cause the feeding to the leer of another row of three articles.

If the articles are of such size that four are to be delivered in a row, then the gear shift arm 21 is moved to bring gear 24 into mesh with gear 28, which gears have a four to four ratio. Or if five articles are to be delivered in a row the gear shift arm is moved to bring gear 24 into mesh with gear 29, which gears have a four to five ratio. If gear 24 meshes with gear 30 six articles will be delivered, if it meshes with gear 31 seven articles will be delivered, and if it meshes with gear 32 eight articles will be delivered.

Thus it is apparent that with the particular arrangement illustrated, the operator can, by the simple shifting of the arm 21, cause the leer loader to operate every time the forming machine makes either three, four, five, six, seven or eight pieces of ware. But even that flexibility may not be sufficient when smaller articles are to be manufactured, and I have therefore provided means whereby the leer loader may be caused to operate every time the forming machine has made six, eight, ten, twelve, fourteen or sixteen articles, and without disturbing the cone gears 27 to 32, or gears 18 and 19. To make this change it is only necessary to remove the supplemental casing 13, and substitute for gears 15 and 16, which have a one to two ratio, other gears having a one to four ratio. With this gear ratio it will be apparent that the cam shaft 8 must rotate eight times, causing eight pieces of ware to be manufactured, for each rotation of the shaft 20. So that if the gear shift arm is so positioned that gear 24 meshes with gear 27, six articles will be delivered in a row, if it meshes with gear 28, eight articles will be delivered in a row, etc.

From the foregoing description it will be apparent that I have provided a leer loader including a simple timing mechanism by which fluid pressure will be periodically admitted to operate the leer loader every time the forming machine has made a fixed number of articles. And that, within certain limits, the number of articles can be varied by the mere shifting of a lever. Also, that by the mere substitution of two gears having another ratio, it is possible by the simple shifting of the lever to vary the number of articles within other limits.

Having fully described the invention, what I claim is:

1. A leer loader including a conveyer for carrying ware from a glass forming machine to a position in front of a leer, a cylinder-operated pusher bar for sweeping a row of ware from said conveyer to a leer conveyer, and means for periodically initiating the operation of the leer loader in accordance with the number of articles made by a forming machine, said means including an air line leading to a cylinder of the cylinder-operated leer loader, a valve in said line, a rotatable shaft, means carried by said shaft for opening the valve upon each rotation of the shaft, a cone gear carried by the shaft, a movable arm, gears carried by the arm and adapted to selectively engage said cone gear, and means for driving the gears of said arm from the cam shaft of a glass forming machine.

2. A leer loader including a conveyer for carrying ware from a glass forming machine to a position in front of a leer, a cylinder-operated pusher bar for sweeping a row of ware from said conveyer to a leer conveyer, and means for periodically initiating the operation of the leer loader in accordance with the number of articles made by a forming machine, said means including an air line leading to a cylinder of the cylinder-operated leer loader, a valve in said line, a rotatable shaft, means carried by said shaft for opening the valve upon each rotation of the shaft, a cone gear carried by the shaft, an oscillatable and slidable arm, gears carried by said arm and adapted to selectively engage said cone gear, and means for driving the gears of said arm from the cam shaft of a glass forming machine.

3. A leer loader including a conveyer for carrying ware from a glass forming machine to a position in front of a leer, a cylinder-operated pusher bar for sweeping a row of ware from said conveyer to a leer conveyer, and means for periodically initiating the operation of the leer loader in accordance with the number of articles made by a forming machine, said means including an air line leading to a cylinder of the cylinder-operated leer loader, a valve in said line, said valve in open position admitting air to the line and in closed position exhausting the line, a rotatable shaft, means carried by the shaft for opening the valve upon each rotation of the shaft, a cone gear driving the shaft, a gear for selectively engaging the cone gear, and means for driving the gear from the cam shaft of a forming machine.

4. A leer loader including a conveyer for carrying ware from a glass forming machine to a position in front of a leer, a cylinder-operated pusher bar for sweeping a row of ware from said conveyer to a leer conveyer, and means for periodically initiating the operation of the leer loader in accordance with the number of articles made by a forming machine, said means including an air line leading to a cylinder of the cylinder-operated leer loader, a valve in said air line, a rotatable shaft, means carried by said shaft for opening the valve upon each rotation of the shaft, a cone gear carried by the shaft, a second shaft, an arm slidably and oscillatably mounted on the second shaft, gears carried by said arm and adapted to selectively engage said cone gears, the gears of the arm being driven by the second shaft, and means for driving the second shaft from the cam shaft of a forming machine.

5. A leer loader including a conveyer for carrying ware from a glass forming machine to a position in front of a leer, a cylinder-operated pusher bar for sweeping a row of ware from said conveyer to a leer conveyer, and means for periodically initiating the operation of the leer loader in accordance with the number of articles made by a forming machine, said means including an air line leading to a cylinder of the cylinder-operated leer loader, a valve in said line, a rotatable shaft, means carried by said shaft for opening the valve upon each rotation of the shaft, means for driving said shaft from the cam shaft of a forming machine, and gear shift mechanism between the cam shaft and the valve operating shaft.

6. A leer loader including a conveyer for carrying ware from a glass forming machine to a position in front of a leer, a cylinder-operated pusher bar for sweeping a row of ware from said conveyer to a leer conveyer, and means for periodically initiating the operation of the leer loader in accordance with the number of articles made by a forming machine, said means including an air line leading to a cylinder of the cylinder-operated leer loader, a valve in said line, a rotatable shaft, means carried by said shaft for opening the valve upon each rotation of the shaft, a cone gear carried by the shaft, a main casing for the shaft and cone gear, a movable arm, gears carried by the arm and adapted to selectively engage said cone gear, a supplemental casing attached to the main casing, meshing gears in said supplemental casing and driving the gears of said arm, and means for driving the gears in the supplemental casing from the cam shaft of a glass forming machine, said supplemental casing being removable for substitution of gears of a different ratio.

WALTER H. FAILINGER.